United States Patent [19]
Popelka et al.

[11] Patent Number: 6,081,883
[45] Date of Patent: *Jun. 27, 2000

[54] PROCESSING SYSTEM WITH DYNAMICALLY ALLOCATABLE BUFFER MEMORY

[75] Inventors: Paul Popelka, Cupertino; Tarun Kumar Tripathy, Sunnyvale; Richard Allen Walter, San Jose; Paul Brian Del Fante, Sunnyvale; Murali Sundaramoorthy Repakula, Milpitas; Lakshman Narayanaswamy; Donald Wayne Sterk, both of Santa Clara; Amod Prabhakar Bodas, Sunnyvale; Leslie Thomas McCutcheon, Fremont; Daniel Murray Jones, Castro Valley; Peter Kingsley Craft, San Francisco; Clive Mathew Philbrick, San Jose; David Allan Higgen, Saratoga; Edward John Row, Mountain View, all of Calif.

[73] Assignee: Auspex Systems, Incorporated, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/985,996

[22] Filed: Dec. 5, 1997

(Under 37 CFR 1.47)

[51] Int. Cl.$^7$ ............................................. G06F 13/00
[52] U.S. Cl. ........................... 712/28; 712/23; 712/29; 712/36; 711/111; 711/121
[58] Field of Search ................ 395/800.01, 800.03, 395/800.23, 800.28, 800.29, 800.3, 800.32, 800.36; 712/1, 3, 23, 28, 29, 30, 32, 36; 711/111, 117, 119, 120, 121, 131

[56] References Cited

U.S. PATENT DOCUMENTS

| | | | |
|---|---|---|---|
| 5,163,131 | 11/1992 | Row et al. | 395/200 |
| 5,303,362 | 4/1994 | Butts, Jr. et al. | 395/425 |
| 5,355,453 | 10/1994 | Row et al. | 395/200 |
| 5,611,049 | 3/1997 | Pitts | 395/200.09 |
| 5,701,516 | 12/1997 | Cheng et al. | 395/842 |
| 5,802,366 | 9/1998 | Row et al. | 709/219 |
| 5,819,292 | 10/1998 | Hitz et al. | 707/203 |
| 5,907,689 | 5/1999 | Tavallaei et al. | 395/290 |
| 5,931,918 | 8/1999 | Row et al. | 703/300 |
| 5,941,969 | 8/1999 | Ram et al. | 710/128 |

OTHER PUBLICATIONS

Auspex Systems, "The NS 7000 NetServer Family Pocket Guide," Document No. 300–MC063.
Auspex Systems, "NS 7000/250 Series NetServers," Product information, Document No. 300–DS046.
Auspex Systems, "NS 7000/700 Series NetServers," Product information, Document No. 300–DS047.

*Primary Examiner*—Daniel H. Pan
*Assistant Examiner*—Dzung C. Nguyen
*Attorney, Agent, or Firm*—Fish & Richardson P.C.

[57] ABSTRACT

A scalable computer system has an interconnect bus providing communication links among a host processor and one or more function-specific processors, including a network processor (NP) and a file storage processor (FSP). The host processor provides a single interface to network administrators for maintaining the system. A bi-endian conversion system is provided to minimize a need for translating between big and little endian data types generated by diverse processors. The NP shares a single memory image with other processors and has a buffer memory for buffering requests from the network interfaces. The buffer memory has one or more segments which are dynamically allocatable to different processors. The FSP has a metadata cache for maintaining information on data being cached in the NP buffer memory. The FSP also has a write cache for buffering file write operations directed at disks. Upon receiving requests for data from the NP, the FSP checks the metadata cache to see if a copy of the requested data has been cached in the NP buffer and, if the copy exists in the NP buffer, causing the NP with the data to respond to the request. The resulting scalable computer provides higher data availability, faster access to shared data, and reduced administrative costs via data consolidation.

45 Claims, 14 Drawing Sheets

PROCESSING SYSTEM WITH DYNAMICALLY ALLOCATABLE BUFFER MEMORY

BACKGROUND OF THE INVENTION

The invention relates to computer data networks, and more particularly, to network file servers for computer networks.

The need for fast, reliable and secure access to vast amounts of shared data worldwide in many companies has been driving the growth of client/server based computing, where applications, data processing power, and other resources are distributed among a network of computers called servers and clients. However, the growth in the number of clients, as well as in their increased data processing capability made possible with advances in microprocessor technology, has placed severe strains on computers that have not been designed specifically for server applications. For instance, although a server can be built using a conventional computer and equipping it with large disk drives and more network interface cards (NICs), such approach does not address fundamental input/output (I/O) limitations. Thus, merely adding larger disks, additional network adaptors, extra primary memory, or even a fast processor does not overcome basic architectural I/O constraints.

To address requirements for high-performance server applications, a number of architectures have been developed. In one such architecture, a CPU, a memory unit, and two I/O processors are connected to a single bus. One of the I/O processors operates a set of disk drives, and if the architecture is to be used as a server, the other I/O processor is connected to a network. In this architecture, all network file requests that are received by the network I/O processor are first transmitted to the CPU, which makes appropriate requests to the disk-I/O processor for satisfaction of the network request. Thus, the CPU has to supervise I/O operations.

In another architecture available from Sun Microsystems, IBM and Hewlett-Packard, among others, a plurality of CPU and memory boards communicate with each other and with input/output boards over a wide and fast bus with a data width as large as 256 bits and an address width of 42 bits. Further, each of the CPU/memory boards has one or more CPUs connected to a memory with a snooping cache coherency protocol. Because of the use of the snooping cache coherency protocol, the system interconnect bus needs to be quite fast. This architecture is a classic symmetric multiprocessing (SMP) design. In this architecture, all data, including user data, metadata such as file directory information, or CPU data, appear on the interconnect bus. The placement of data close to the processors makes the SMP architecture ideal for computer server applications. However, the SMP approach demands close communications between processors. The maintenance of consistency between processors is also non-trivial. The overhead and complexity of the consistency protocols may not justify the load balancing benefits gained through the SMP architecture. Additionally, as the SMP approach treats each processor as having the same capability, the SMP approach can not take advantage of processors which are dedicated and optimized for specific tasks.

In yet another computer architecture, a disk controller CPU manages access to disk drives, and several other CPUs, three for example, may be clustered around the disk controller CPU. Each of the other CPUs can be connected to its own network. The network CPUs are each connected to the disk controller CPU as well as to each other for interprocessor communication. In this computer architecture, each CPU in the system runs its own complete operating system. Thus, network file server requests must be handled by an operating system which is also heavily loaded with facilities and processes for performing a large number of other, non file-server tasks. Additionally, the interprocessor communication is not optimized for file server type requests.

In another computer architecture, a number of CPUs, each having its own cache memory for data and instruction storage, are connected to a common bus with a system memory and a disk controller. The disk controller and each of the CPUs have direct memory access to the system memory, and one or more of the CPUs can be connected to a network. This architecture is not optimal for a file server because, among other things, both file data and the instructions for the CPUs reside in the same system memory. There will be instances, therefore, in which the CPUs must stop running while they wait for large blocks of file data to be transferred between system memory and the network CPU. Additionally, as with both of the previously described computer architectures, the entire operating system runs on each of the CPUs, including the network CPU.

In another type of computer architecture, a large number of CPUs are connected together in a hypercube topology. One of more of these CPUs can be connected to networks, while one or more can be connected to disk drives. In this architecture, interprocessor communication costs are high for file server applications.

Thus, what is needed is an architecture for a file server which provides high data availability, fast access to shared data, and low administrative costs via data consolidation.

SUMMARY OF THE INVENTION

A scalable file server has a host processor, one or more function-specific processors, including network processors (NPs) and file storage processors (FSPs), all operating in parallel with the host processor on a unified memory map providing a single memory image and communicating over an interconnect bus.

The NP has one or more network interfaces and a buffer memory for buffering requests from network interfaces. The buffer memory in turn has one or more segments which are dynamically allocatable to different file processors. The FSP has one or more data storage devices for storing files and associated metadata about files. The FSP also has a metadata cache for buffering the metadata and for caching information on data stored on the NP buffer memory. The FSP further has a write buffer coupled to the FSP for buffering file write operations from the FSP. Each of the function-specific processors has a function-specific cache. Thus, the NP has a read cache, while the FSP has a metadata cache and a write buffer.

The NPs each connect to one or more networks, and provide all protocol processing between the network layer data format and an internal file server format for communicating client requests to other processors in the system. Only those data packets which cannot be interpreted by the NPs, for example client requests to run a client-defined program on the server, are transmitted to the host processor for processing. Thus the network processors and file storage processors contain only small parts of an overall operating system, and each is optimized for the particular type of work to which it is dedicated.

During operation, client requests for file operations are received and analyzed by the NPs, and if acceptable, are relayed to one of the FSPs which, independently of the host, manages the virtual file system of mass storage devices connected to the FSP. Upon receiving requests for data from the NP, the FSP checks the metadata cache to see if a copy of the requested data has been cached in the NP buffer and, if the copy exists in the NP buffer, the FSP requests the NP with the data to respond to the request.

In one aspect of the invention, a bridge is provided between the interconnect bus and the data storage device of each FSP so that, for simple disk block access requests, a processor in the FSP does not need to be involved. In this manner, the flexible data path between network processors and file storage processors can minimizes intermediate storage of the data making best use of the available bandwidth.

In another aspect, as the system deploys a plurality of processors, each of which has its own format such as most significant bit first (big endian) or least significant bit first (little endian), a bi-endian translator is provided to ease data type conversion processing when data transfer occurs among processors with different endian data types.

In yet another aspect, to further minimize the overhead of copying and moving data among the processors, the ownership of portions of the memory in each processor can be dynamically assigned to other processors such that files can be simultaneously operated on by a multitude of clients communicating over a multitude of networks. The FSPs thus collectively provide a single memory image with a memory management that allows a transfer of authority to another FSP and with distributed data content management.

Advantages of the system includes the following. The server scalably distributes the processing load to independent processors, each optimized to perform a specific function: for example, network processing, file processing, storage management or operating system applications and utilities. A single system image is presented to an application or a client. Further, the system minimizes overhead between the functional processors to reduce the communication overhead.

The decoupling of the host processor from the server enhances the operating system reliability. Since data services such as network file system (NFS) data services are handled by the functional processors and a message passing functional micro kernel (FMK), NFS data service can continue uninterrupted while the host processor is rebooted in the event that the host processor needs to be rebooted.

The host processor also provides a single point of administration for system utilities and tools, including monitoring and tuning software. Since these activities are independent of file input/output operations, network file system (NFS) requests are serviced simultaneously with no performance degradation. This allows systems administrators to complete system management functions such as file backup and restore when convenient during normal system operation instead of during off hours.

System administration costs are reduced since information system staff has fewer servers to manage. Further, the updating of software, conducting backups and archiving, as well as offering consistent user access to data is greatly simplified as the host computer becomes the focal point of the server.

The resulting server is powerful, scalable and reliable enough to allow users to consolidate their data onto one high performance system instead of scores of smaller, less reliable systems. This consolidation of data resources onto a powerful server brings a number of advantages to the client-server environment. The consolidation of data reduces the need to replicate data and to manage the consistency of the replicated data. Data is available more quickly and reliably than a conventional client-server architecture.

Other features and advantages will be apparent from the following description and the claims.

DETAILED DESCRIPTION

The invention will be described with respect to particular embodiment thereof, and reference will be made to the drawings, in which:

FIG. 9b is a processing model for the process of FIG. 9a;

DESCRIPTION OF THE PREFERRED EMBODIMENTS

Figure 1:
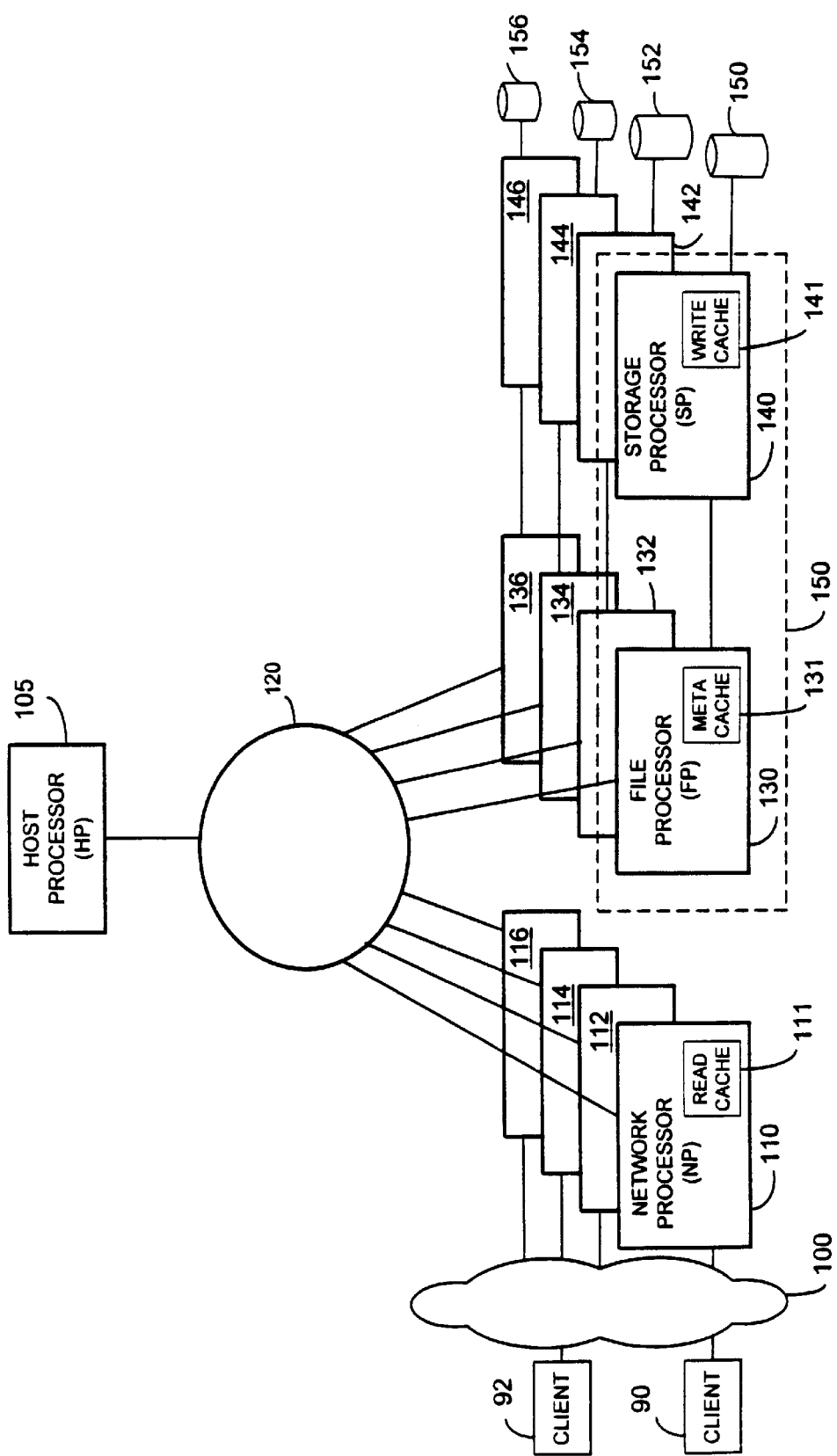
FIG. 1 is a block diagram of a computer system having one or more loosely coupled processors.

Referring now to FIG. 1, a computer system having a plurality of loosely coupled processors that collectively provide a high performance server is illustrated. Client computers 90 and 92 are connected over a network 100 to one or more network processors (NPs) 110, 112, 114 and 116. Each network processor has a read cache 111 for buffering previous requests for data from clients 90 or 92. Each network processor also has a mount table for routing messages to their appropriate destinations. Thus, with the mount table, the network processor can directly forward a request to an appropriate functional processor, based on pre-determined criteria. Further, each of the network processors 110–116 is connected into an interconnect bus 120.

The interconnect bus 120 may be a computer bus such as a PCI bus, a SCSI bus, or a Scalable Coherent Interface (SCI) bus which is a distributed interconnect bus. In one embodiment using the SCI bus, the SCI interconnect 120 may be deployed using a number of topologies, including a ring configuration where subsystems are connected as a ring which is not hot-pluggable. Alternatively, the SCI interconnect 120 may be a multi-ported switch where each subsystem is on its own SCI ring and therefore can be hot plugged. Additional port switches can be used to allow the system to improve the bandwidth. The standard SCI interconnect uses five meter point to point cabling with two fifty pin very high density Small Computer System Interface (SCSI) style connectors for both the input and output of the SCI interconnect 120.

Also attached to the interconnect bus 120 is a host processor (HP) 105. The host processor 105 runs an operating system such as Windows-NT, available from Microsoft Corp. of Redmond, Wash., or Solaris UNIX operating system, available from Sun Microsystems of Mountain View, Calif. The host processor 105 provides a platform for network and system administration, backup and archive operations, database management, and other applications. Functions such as network information services (NIS) and network lock manager (NLM) can also be executed on the host processor 105.

To further improve reliability, other components in the system of FIG. 1, such as the network processors 110–116, may monitor the status of the host processor 105 and determine when the host processor 105 is inoperative. If the host processor 105 is hung, network processors 110–116 can force the host processor 105 to reboot. In this event, the network processors 110, 112, 114 and 116 and file processors 130, 132, 134 and 136 retain any state information the host processor 105 requires such as the state of the network interface cards while the host processor 105 is booting. New status messages are saved and forwarded to the host processor 105 after the reboot is complete. New mount requests, and NIS queries are serviced as soon as the reboot is complete. In a similar manner, in the event that one of the network processors or file processors fails, the computer system of FIG. 1 continues to operate without failing.

Also connected to the interconnect bus 120 are one or more file processors (FPs) 130, 132, 134 and 136. Each of the file processors has a metadata cache 131 which contains file management information, including a directory name look up table, among others. The directory name look up table is used to speed up directory look ups, as Unix file system (UFS) directories are flat and much be searched sequentially. Further, the directory name look up table maintains hits and misses for short file names. In the directory name look up the structures are kept in a least recently used (LRU) order and maintained as a hashed table.

Each of the file processors 130, 132, 134 and 136 is connected in turn to a storage processor (SP) 140, 142, 144 and 146. Additionally, each of the storage processors is connected to disks 150, 152, 154 and 156, respectively. Furthermore, each of the storage processors 140, 142, 144 and 146 has a write cache 141 which buffers write requests to the respective disk drives 150–156 to increase I/O data transfer performance and decrease acknowledgment latencies. In this manner, the network processors 110, 112, 114 and 116 can individually access any of the file processors 130, 132, 134 and 136. Furthermore, each of the file processors can go through a storage processor and a disk to retrieve information requested by the client.

The network processors 110, 112, 114 and 116 each connect to one or more networks, and provide all protocol processing between the network layer data format and an internal file server format for communicating client requests to other processors in the system. Only those data packets which cannot be interpreted by the network processors 110–116, for example client requests to run a client-defined program on the server, are transmitted to the host processor 105 for processing. Thus the network processors 110, 112, 114 and 116, and file processors and storage processors 130, 132, 134, 136, 140, 142, 144 and 146 contain only small parts of an overall operating system, and each is optimized for the particular type of work to which it is dedicated.

Although the FPs 130, 132, 134 and 136 are shown apart from the SPs 140, 142, 144 and 146, the FPs 130, 132, 134 and 136 can be combined pairwise with their respective SPs 140, 142, 144 and 146. For instance, the combination of the FP 130 and SP 140 creates a file storage processor (FSP) 150.

The SCI interconnect 120 supports booting of processors from the host processor 105. Generally, an on-board SCI Basic Input/Output System (BIOS) initializes the SCI interface and configures it to participate on the SCI interconnect ring 120. From there, the presence of the processor is detected by the host processor 105, where an SCI configuration utility takes over.

The SCI configuration utility initially configures the system. In the initialization mode, the utility "explores" the topology of the SCI interconnect bus 120. Once an NP or FSP node has been discovered, the utility reads from a configuration space on that node to determine the node type, such as network processor or file storage processor differentiation. Next, the utility configures and sets initialization parameters needed by that node, including the resource name of the node. This step includes the allocation of identification numbers and other information that the node may need. The utility then selects the load image for the board, downloads it over the SCI interconnect bus 120, and sets the configuration information so that the node can obtain it. This may be a boot block or a fixed location in nonvolatile RAM for all nodes to access. Next, the nodes are reset to execute and all configuration information is saved into a file for subsequent retrieval. In reboot mode, the utility uses the configuration file previously created to configure and download the boot image to the nodes.

In the loosely coupled processing system of FIG. 1, as a number of disparate processors work together, different data representation formats, including big-endian format and small-endian format, may exist. The presence of mixed-endian processors raises the possibility that the FMK kernel has to perform endian-swap for each data transfer operation. To avoid this conversion penalty, the FMK handles data types by enforcing a bi-endian message format. The process for handling both big-endian and little endian data types, as generated by the plurality of processor types operating in the system of FIG. 1, is discussed next.

In this format, all numeric fields in messages must be 4-byte quantities. Smaller numerics must be cast to and from 4 bytes when moving values in or out of messages. Further, 64-bit variables must be transported in messages as explicitly-named high and low halves. Additionally, all numeric fields must appear in a contiguous region at the start of the message and there may be no unions of numeric and other types of data. Thus, any other data such as ASCII strings will follow numeric data in the message.

Message types are constructed using a K_MAKETYPE ( ) macro, which encodes the number of numeric fields along with information that allows the FMK to determine whether the message originates from a cross-endian processor. If so, the FMK kernel will automatically byte-swap the numeric fields. A listing of the macro is as follows:

```
#define K_MAKETYPE(class, opcode, nlen)
    ( ((class) << 24)           |
    (((opcode) & 0xffff) << 8)  |
    (((nlen) / sizeof(long)) & 0x3f)  | 0x80 )
The macro to extract the opcode appears below:
#define K_OPCODE(msg)   ((unsigned) ((msg) & 0x00ffff00) >> 8)
#define K_CLASS(msg)    ((unsigned) ((msg) & 0xff000000) >> 24)
```

For compact switch tables, dispatch routines should switch on opcode, not the whole K_MSGTYPE. For relatively complex messages with multiple numeric fields in both request and reply, it is necessary to create separate message types for request and reply, since the number of numeric fields may be different in request and reply. In such case, the message should be constructed as a union of input and output structures.

For illustration purposes, one implementation supporting a example "BLETCH" message type which contains ASCII data as well as numeric data and with a class of 'B' and an opcode of 666 is shown below:

```
struct bletch_input_nums {
    K_MSGTYPE   type;
    long        bletch_in0;
    long        bletch_in1;
    long        bletch_in2;
    long        bletch_in3;
    long        bletch_in4;
    long        bletch_in5;
};
struct bletch_output_nums {
    K_MSGTYPE   type;
    long        errno;
    long        bletch_out0;
    long        bletch_out1;
    long        bletch_out2;
    long        bletch_out3;
};
typedef union {
    struct bletch_in {
        struct bletch_input_nums b_innum;
        char    bletch_ascii_in[100];
    } in;
    struct bletch_out {
        struct bletch_output_nums b_outnum;
        char    bletch_ascii_out[50];
    } out;
} B_BLETCH_T;
To construct the actual K_MSGTYPEs for the input and output
messages, the following macro can be used:
#define B_BLETCH     K_MAKETYPE(BLETCH_MSG_TYPE,
             666, sizeof (struct bletch_input_nums))
#define B_BLETCH_R   K_MAKETYPE(BLETCH_MSG_TYPE,
             666, sizeof (struct bletch_output_nums))
```

In this example, the initial type field counts as one of the "numerics". It is therefore convenient to include it in the struct which gathers the numerics together. This convention also simplifies the type construction for the case of simple messages that have only one or two parameters and maybe no return value other than an error indicator. In that case, the type can be constructed using the message structure itself:

```
typedef struct {
    K_MSGTYPE   type;
    long        errno;
    long        parameter;
```

```
} B_SIMPLEBLETCH_T;
#define B_SIMPLEBLETCH  K_MAKETYPE(BLETCH_MSG_TYPE,
            667, (sizeof(B_SIMPLEBLETCH_T)))
```

Figure 2:
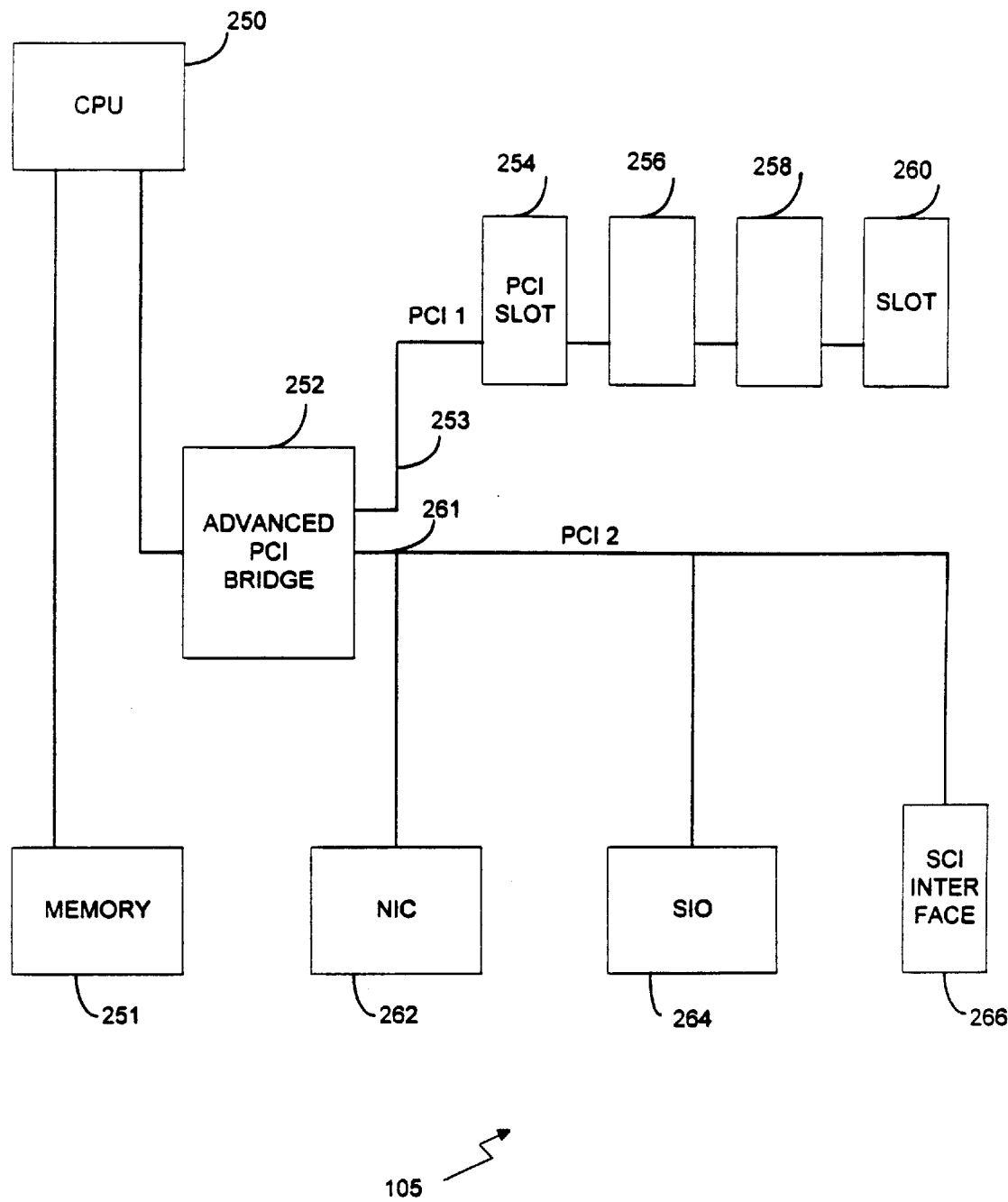
FIG. 2 is a schematic illustration of a host computer of FIG. 1.

Referring now to FIG. 2, a schematic diagram of the host processor 105 is illustrated in detail. In FIG. 2, a CPU 250, such as an Ultra Sparc Processor, available from Sun Microsystems, Inc. of Mountain View, Calif., is connected to a memory 251. Further, the CPU 250 is also connected to an advanced peripheral component interconnect (PCI) bridge 252. The bridge 252 has a plurality of PCI buses 253 and 261, respectively. One or more PCI slots 254, 256, 258 and 260 are provided on the first PCI bus 253. On the second PCI bus 261, a network interface card 262, a serial input/output card 264 and a SCI interface board 266 are connected. The CPU 250 runs the following software modules:

TCP and socket layers. The Transport Control Protocol ("TCP"), which is used for certain server functions other than NFS, provides reliable bytestream communication between two processors. Sockets are used to establish TCP connections.

VFS interface. The Virtual File System ("VFS") interface is a standard Solaris file system interface. It paints a uniform file-system picture for both users and the non-file parts of the Unix operating system, hiding the details of the specific file system. Thus standard NFS, LNFS, and any local Unix file system can coexist harmoniously.

UFS interface. The Unix File System ("UFS") interface is the traditional and well-known Unix interface for communication with local-to-the-processor disk drives.

Device layer. The device layer is a standard software interface between the Unix device model and different physical device implementations. In the system of FIG. 1, disk devices are not attached to host processors directory, so the disk driver in the host's device layer uses the messaging kernel to communicate with the storage processor 140.

Route and Port Mapper Daemons. The Route and Port Mapper daemons are Unix user-level background processes that maintain the Route and Port databases for packet routing. They are mostly inactive and not in any performance path.

Yellow Pages and Authentication Daemon. The Yellow Pages and Authentication services are Sun-ONC standard network services. Yellow Pages is a widely used multipurpose name-to-name directory lookup service. The Authentication service uses cryptographic keys to authenticate, or validate, requests to insure that requesters have the proper privileges for any actions or data they desire.

Server Manager. The Server Manager is an administrative application suite that controls configuration, logs error and performance reports, and provides a monitoring and tuning interface for the system administrator. These functions can be exercised from either system console connected to the host 105, or from a system administrator's workstation.

In this manner, the CPU 250 of the host processor 105 executes the operating system Unix, provides standard ONC network services for clients, and executes the Server Manager. Since Unix and ONC are ported from the standard Solaris and ONC Services, the server system of FIG. 1 can provide identically compatible high-level ONC services such as the Yellow Pages, Lock Manager, DES Key Authenticator, Auto Mounter, and Port Mapper. Further, Solaris network disk booting and more general Internet services such as Telnet, FTP, SMTP, SNMP, and reverse ARP are also supported. Finally, print spoolers and similar Unix daemons operate transparently.

The host processor 105 is a conventional OEM computer available from Sun Microsystems, Inc. incorporating an Ultra-SPARC processor. Other processors, such as a Alpha-based processor, available from Digital Equipment Corp., are also possible.

Figure 3:
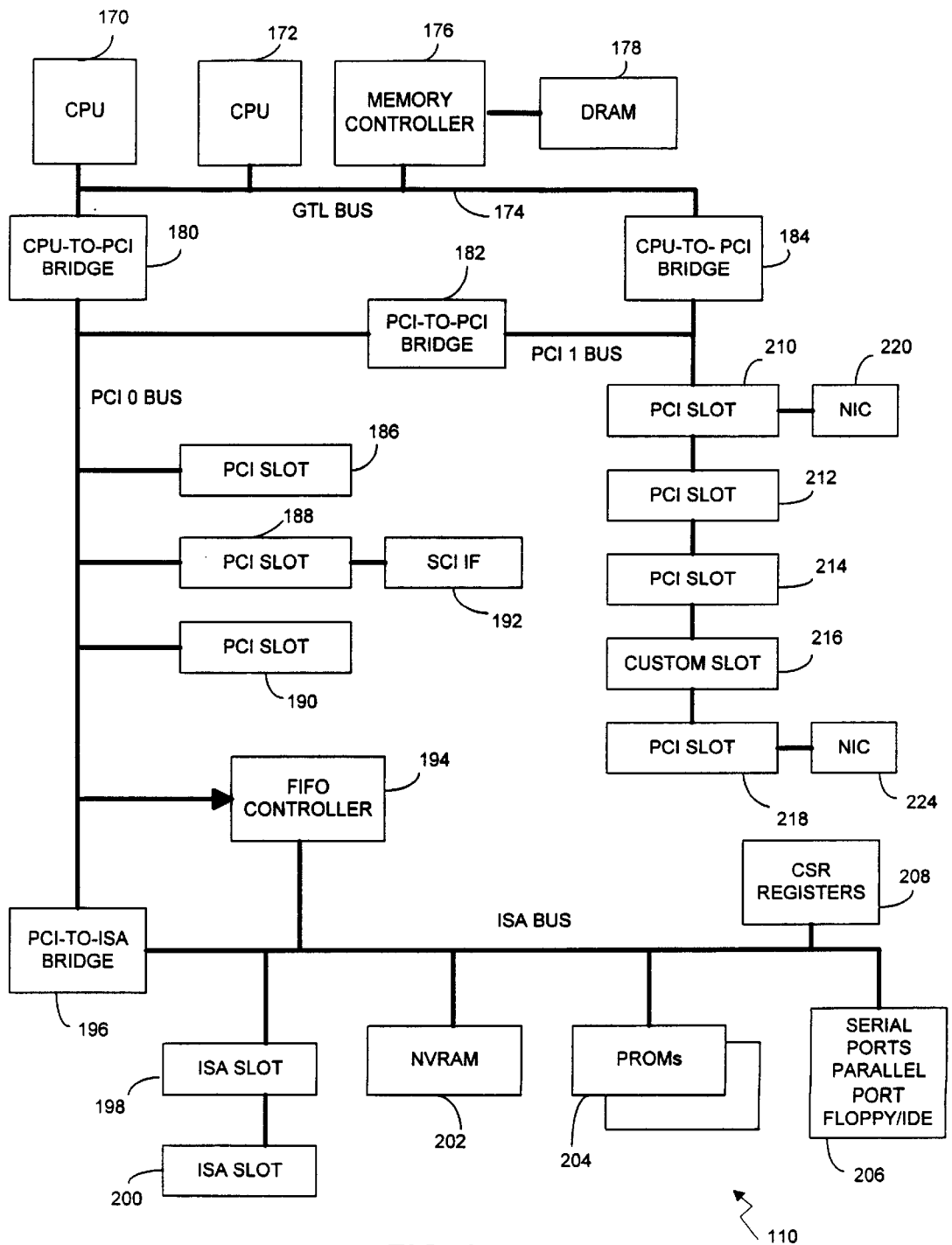
FIG. 3 is a schematic illustration of a network processor of FIG. 1.

Referring now to FIG. 3, a schematic diagram of the network processor 110 is illustrated. The network processor 110 is a dual processor system with CPUs 170 and 172. The CPU 170 and CPU 172 communicate over a processor bus 174. Also connected to the processor bus 174 is a memory controller 176 which drives a dynamic read random access memory (DRAM) array 178. The DRAM array 178 provides a buffer for the read cache 111 (FIG. 1).

A plurality of CPU-to-PCI bridges 180 and 184 are also connected to the processor bus 174 to provide PCI0 bus and PCI1 bus, respectively. The two PCI buses are bridged via a PCI to PCI bridge 182.

Turning now to the PCI0 bus, the bridge 180 is connected to a custom proprietary slot 186. The bridge 180 is also connected to one or more PCI slots 188 and 190. Particularly, the PCI slot 188 is connected to an SCI interface board 192 which plugs into the interconnect bus 120 of FIG. 1. The PCI to SCI connection is provided via a PCI to SCI bridge that uses components available from Dolphin Interconnect Solutions.

Additionally, the bridge 180 is connected to a first in first out (FIFO) controller 194 and to a PCI to industry standard architecture (ISA) bridge 196. The System Command FIFO on the system 110 is memory based. The FIFO controller 194 is designed to accept writes from the primary PCI bus and to update the data to a circular buffer located in main memory. The FIFO is placed so as to provide positive acknowledgment of message reception through the transaction protocol. The pointer passing protocols between SCI nodes will have to select the proper SCI transactions to ensure that the 8 byte message pointers are transferred as atomic operations.

There are two different FIFO addresses. One address range is dedicated to interprocessor communication across the SCI interconnect 120. Interprocessor messages are 8 bytes in size. Further, a local FIFO address range is available for diagnostics purposes and the messages are 4 bytes in size. If a write of a different size than expected is attempted, the FIFO controller 194 responds with a Target Abort and no data will be forwarded to main memory. Also, a FIFO-Bad-Size-Write error bit will be set in the FIFO status register as well as a FIFO-Error bit in the Interrupt Request register.

The FIFO controller 194 contains a local buffer for holding a single 8-byte message. If a write to the FIFO is attempted while this local buffer is full, the FIFO controller 194 will issue a retry on the PCI bus, since it expects to be able to empty the local buffer soon. However, to prevent deadlock, if the FIFO controller 194 issues 31 retries in a row, then it assumes that something is wrong with the DMA controller and will begin to issue Target Aborts. It will also turn on the FIFO-Watchdog-Error bit in the FIFO status register and set the FIFO-Error bit in the Interrupt Request register.

The FIFO uses ISA DMA channel 5 to write the FIFO data into main memory. The ISA DMA controller should be set up with the location and size of the circular buffer located in main memory and put in auto-initialize mode. Because the FIFO controller 194 uses the lower address bits of the circular buffer to select which words to place where, the FIFO buffer in main memory must be 8-byte aligned.

The FIFO controller 194 keeps track of the total number of available FIFO entries. It contains a 14-bit counter for this function, allowing a maximum of 16K entries in the FIFO. Since each FIFO entry is 8 bytes, this equates to a maximum FIFO size of 128K bytes. At reset, this counter is cleared, indicating that the FIFO is full. Writing to a AddSize register in the FIFO controller 194 will add the value written to the current available space register in the controller.

In order to support an interrupt mode, the FIFO controller 194 also contains a FIFO Size register. Software programs this register with the size of the FIFO buffer in memory. Anytime the Free Size and FIFO Size registers are not equal, the FIFO is not empty and so an interrupt is generated.

All data written into main memory is 8 bytes in size. When data is written to the primary FIFO address, all 8 written bytes will be put into main memory. When data is written to the local FIFO address, the 4 bytes written constitute the high half of the 8 bytes that are DMA'd into main memory. The low half is the low 4 bytes were in the last primary FIFO write. In other words, a write to the local FIFO address space only changes the upper half of the controller's buffer, but the entire 8-byte buffer is DMA'd into memory.

During normal polling operation, the FIFO process flow is as follows:

1) The FIFO controller 194 decodes a write on the PCI bus. If the write is not the correct size or if the available space counter is 0, the controller responds with a Target Abort. If the FIFO controller 194's buffer is busy with a previous FIFO write that has not been DMA'd to main memory, it will respond with a local retry. Otherwise, it latches the write data and request DMA service on the ISA bus.

2) When the ISA DMA controller wins an arbitration, it reads the 8-byte message out of the FIFO controller 194 and places the message into main memory. The FIFO controller 194 decrements its available space counter by 1, and the ISA DMA controller increments its address pointer to the next FIFO element.

3) The CPU polls the location that the next FIFO message will be placed into and notices that a new message has just arrived. It processes the message and subsequently clears the location.

4) Periodically, the CPU writes to the AddSize register to tell the FIFO controller 194 that it has processed n messages and therefore, those spaces are available again. To minimize overhead, the CPU only writes to the AddSize register when a larger number of messages have been processed.

During interrupt mode, the main difference is that in step 3, instead of the CPU polling memory for the next message, an interrupt is generated. This interrupt remains on until the Free Size register equals the FIFO Size register.

The FIFO controller 194 and the PCI to ISA bridge 196 in turn is connected to an ISA bus. Mounted on this bus are ISA slots 198 and 200, a non-volatile random access memory (NVRAM) 202 for storing system BIOS information, one or more programmable read only memories (PROMs) 204, and one or more data transfer ports 206, which may include serial ports, parallel ports, and floppy and hard disk ports. The ISA bus is also connected to a register file 208 for maintaining system status information.

In the dual PCI bus system of FIG. 3, networking traffic and network interface card (NIC) management data pass on the secondary PCI bus PCI1. This arrangement allows the PCI buses to operate at a lower level of the utilization, thus providing better response time and freeing up channels for any of the already minimized CPU-to-IO bus transactions. Further, to elevate the CPU processing efficiency and to minimize the CPU cache stalls, processing ownership may be divided along the lines of data or instruction intensive operations. If so, one of the processors 170 or 172 may process the Internet protocol (IP) using the NFS protocol and run FMK and any other network related code while the remaining CPU 170 or 172 may perform intelligent data moving and checksumming. In such a system, the dual processor system of FIG. 3 would keep the working set of cache lines of the protocol processing primarily in cache since instructions would not be replaced by cache fills on data being moved or checksummed.

The second CPU to PCI bridge 184 is further connected to a plurality of PCI slots 210, 212, 214, 216 and 218. Further, each of the PCI slots 210–218 is connected to a network interface card (NIC) 220–224. In this manner, the network processor 110 provides sufficient network data transfer capability over the NIC 220–224.

Figure 4:
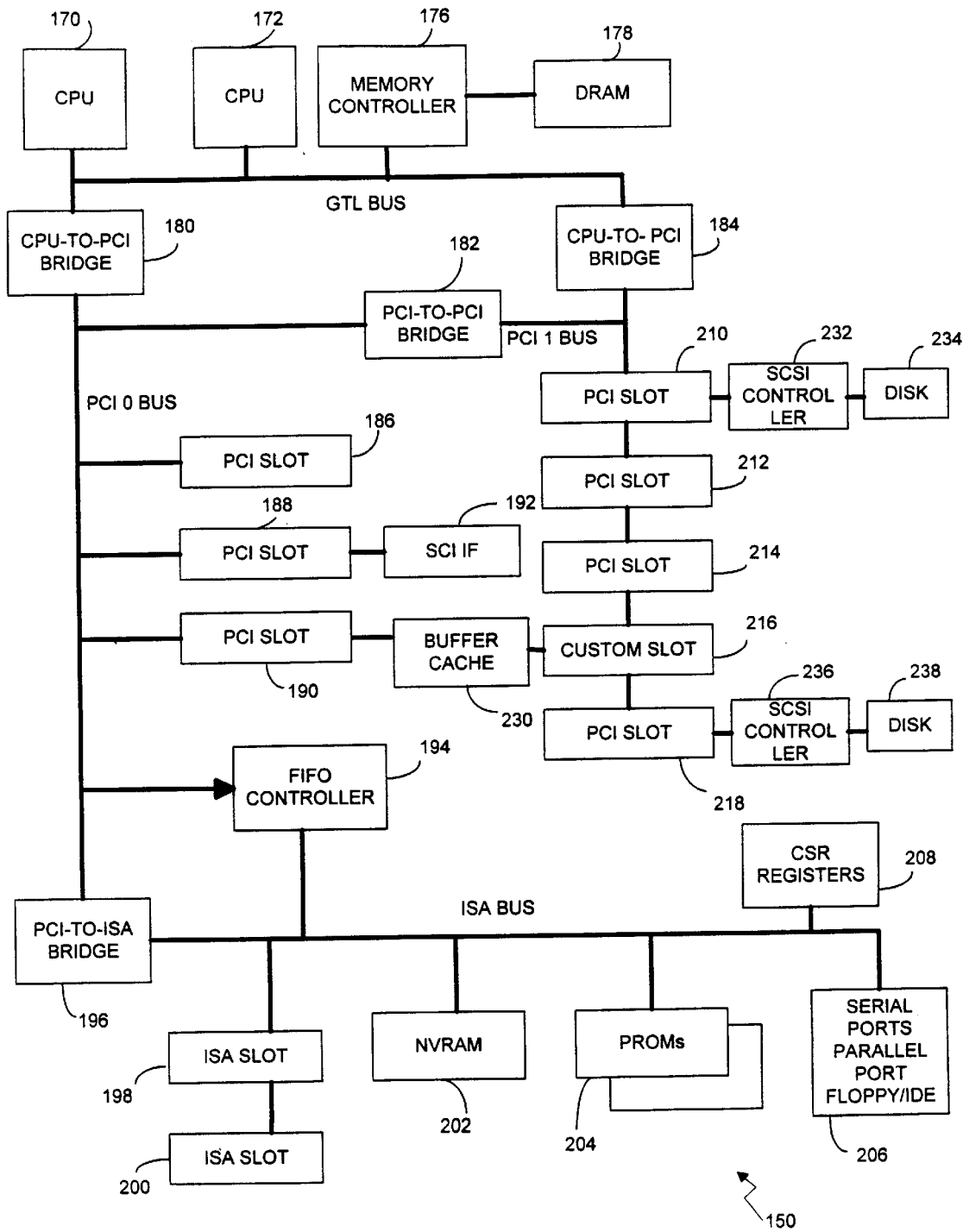
FIG. 4 is a schematic illustration of a file storage processor of FIG. 1.

Referring now to FIG. 4, a diagram illustrating the components of a combined file storage processor (FSP) 150 combining the functions of the file processor 130 and the storage processor 140 is shown. The merging of the file processor 130 and the storage processor 140 eliminates the need to transfer raw metadata over the interconnect bus 120 had the storage processor 140–146 been connected directly to the interconnect bus 120.

In FIG. 4, a schematic illustration of the FSP board 150 is shown. The NP 110 and FSP 150 share a common design reference to reduce cost. One difference between the NP 110 of FIG. 3 and the FSP 150 of FIG. 4 is the substitution of network interface cards 220 and 224 with SCSI controllers 232 and 236, which in turn controls one or more disks 234 and 238, respectively.

Another difference between the NP 110 of FIG. 3 and the FSP 150 of FIG. 4 is the use of a write buffer 230 coupling PCI slots 186 and 216 together. The write buffer 230 increases system performance by reducing write latency and improving redundant array of inexpensive disk (RAID) performance in both normal and degraded mode. It acts both as a nonvolatile staging buffer for writes to any single disks or array and also as a multi-function hardware exclusive or engine. The write buffer 230 is positioned between the PCI buses to enable certain accesses over the SCI interconnect bus 120 to be routed directly to the disk controllers controlling the data storage devices rather than going through the processor as a middle man, thus enhancing performance while decreasing bus contention.

The write buffer 230 minimizes latency by requiring little or no software intervention to perform its various functions. That is possible because the control of different read support functions is mapped within the write buffer 230 address base and thus allows commands to be encoded in the upper bits of the address pointers using direct memory access (DMA) transfers. As a result, concurrent streams of data can be supported in and out of the write buffer 230.

In FIG. 4, the DRAM 178 is partitioned into a metadata cache, code, data cache for the host, among others. The write cache buffers writes to the disk drives and thus enhances performance, since memory write operations are a magnitude order faster than disk write operations. The metadata cache contains file management information, which supports both multiple file allocation and random access. The file management information can convert from a logical block number to a physical sector number by indexing into the array using the logical block number. In addition to logical to physical block mapping, the metadata cache includes information on the type and access mode for the file, the file's owner, the group access identifier, the number of references to the file, the time the file was last read and written, the time the metadata cache was last updated, the size of the file, and the number of physical blocks used by the file, among others. The directory name look up table is used to speed up directory searches, as Unix file system (UFS) directories are flat and are searched sequentially. Further, the directory name look up table maintains hits and misses for short file names. In the directory name look up the structures are kept in a least recently used (LRU) order and maintained as a hashed table.

Figure 5:
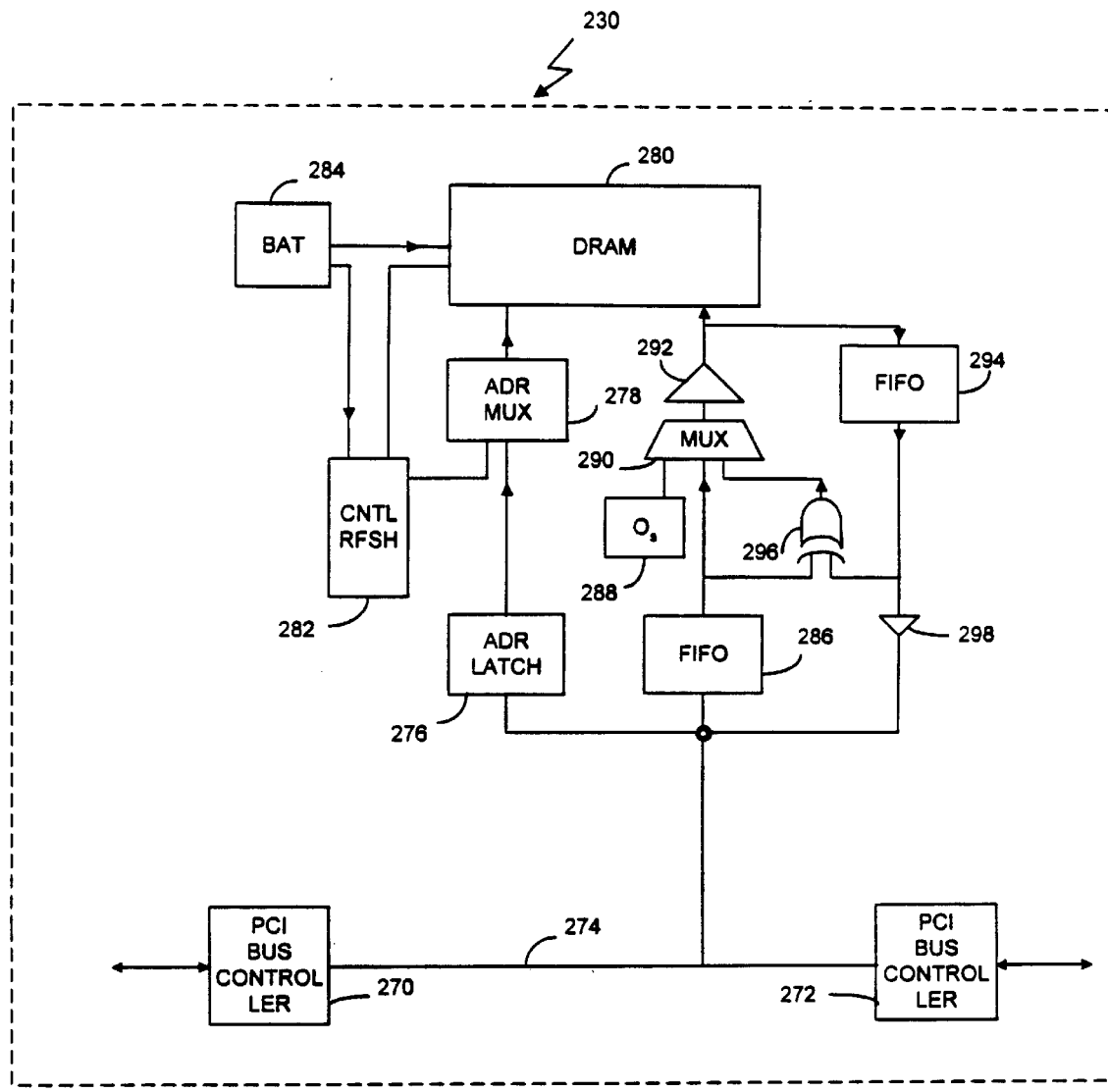
FIG. 5 is a schematic illustration of a write buffer used in the file storage processor of FIG. 4.

Referring now to FIG. 5, a more detailed description of the write buffer 230 is illustrated. The write buffer 230 has a configurable, non-volatile DRAM storage 280 and a high performance hardware exclusive-OR (XOR) engine 296. A plurality of PCI bus controllers 270 and 272 are respectively coupled to PCI slots 190 and 216 (FIG. 4). The PCI interface for bus controllers 270 and 272 includes a bidirectional chaining DMA capability for memory to memory transfers between the write buffer 230 and the DRAM 178 (FIG. 4).

The PCI bus controllers 270 and 272 in turn are connected to an internal bus 274. Also connected to the bus 274 is an address latch 276. The output of the address latch is connected to an address multiplexer 278. The output of the address multiplexer 278 is connected to the DRAM array 280. Also connected to the DRAM array 280 is a memory controller 282 which performs refresh functions, among others. Additionally, the DRAM 280 and the controller 282 is supported by back up batteries 284 in the event of unscheduled power outage.

For RAID operations, the DRAM 280 is configured as two separate but logically paired buffers. Each buffer can be accessed through a separate address space. The usage of the two buffers differ in that a DATA buffer holds unmodified copies of the write data, while a XOR Buffer is used for data parity generation. The logical pairing allows the same DMA data transferring in and out of the write buffer 230 to also drive the parity generation logic. This has the twofold benefit of increasing effective memory bandwidth and reducing control complexity.

The write buffer 230 also deploys the exclusive OR (XOR) engine 296 to assist in performing the RAID operations. The XOR engine 296 is integrated into the data path and is used to generate new parity for data writes, reconstruct data upon a device failure, verify the correctness of the parity of a RAID, and to initialize (zero) buffers. The different functions of the XOR engine 296 are selected by decoding the address bits of the internal bus 274 so that upper address bits will be decoded as commands to the write buffer 230.

Typically, all write accesses to the XOR engine 296 map to a XOR engine function. For example a XOR write results in a read-modify-write transaction to the XOR buffer. The old data is read from the disk into a FIFO register in the XOR engine 296 and then XORed with the new data and the result is written back into the XOR buffer, all without affecting the DATA buffer.

Turning now to the exclusive OR engine, a first in first out (FIFO) 286 is connected to the internal bus 274. The FIFO 286 in turn drives a multiplexer 290. The multiplexer 290 also receives the input from a zero register 288 as well as the output of an exclusive or gate 296.

One input of the exclusive or gate 296 is connected to the output of the FIFO 286, while the other input is connected to the output of a second FIFO 294. The output of the multiplexer 290 drives a buffer 292 which is turn is connected to the DRAM 280. The output of the buffer 292 is also connected to the input of the FIFO 294. Additionally, the output of the FIFO 294 is provided to a buffer 298 which is turn is connected to the internal bus 274. The placement of the XOR engine 296 in the data path thus allows XOR operations to be performed on the fly, improving RAID throughput and reducing the RAID write bandwidth load on the secondary PCI bus.

The XOR functionality supports efficient support for small RAID Writes, large RAID Writes (or data streaming), read recovery and disk array verification. The access modes to the write buffer 230 that can be selected by address decoding include:

Transparent (R/W) mode which is a transparent access to or from the entire write buffer 230. It can be used for diagnostic access or transferring unmodified data. A small amount of the address frame is set aside for configuration registers. The transparent read is used to unload the XOR buffer to disk.

Mirror Write (W) mode which causes a copy to be written to the XOR buffer at the same time as data is written to the data buffer. It is used to initialize the XOR buffer for parity generation.

XOR (R/W) mode, which treats read and write functions differently. A write to the XOR address space becomes a read-modify-write cycle used to generate the read parity block. The data in the XOR buffer is exclusive-ORed with the data being written to the XOR buffer and the result written back to the XOR buffer.

A Mirror Write operation is used to initialize the XOR buffer for parity generation. In this case, initialization means that a copy of the data written to the DATA buffer is also placed in the XOR buffer. The XOR buffer and DATA buffer locations are paired so that the same DMA address can be used to access both during the same transfer. The benefit of initializing the parity buffer at the same time that the data is received into the data buffer is that the reads from disk of original data and original parity can be scheduled without regard to order.

Figure 6:
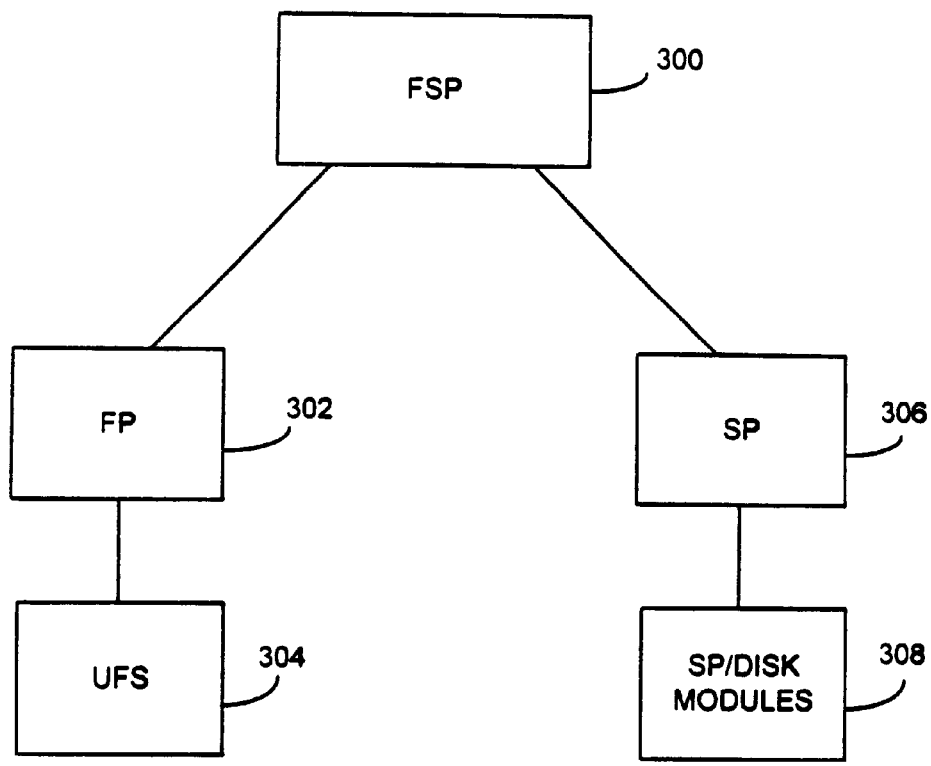
FIG. 6 is an illustration of a message handler in the file storage processor of FIG. 1.

Referring now to FIG. 6, a block diagram illustrating the process for handling messages for both the file storage processor 150 is shown. In FIG. 6, a message 300 is directed at the FSP system 150. Upon receipt, system 150 determines whether or not the message is to be directed to the file processor 130 in step 302 or to be directed to the storage processor 140 in step 306. In the event that the message is to be delivered to the file processor 320, the system of FIG. 6 proceeds to send that message to the appropriate Unix file system (UFS) in step 304 for appropriate handling. Alternatively, if the message is intended for the storage processor 140 in step 306, the message is then sent to the appropriate storage processor or disk module 308.

Figure 7:
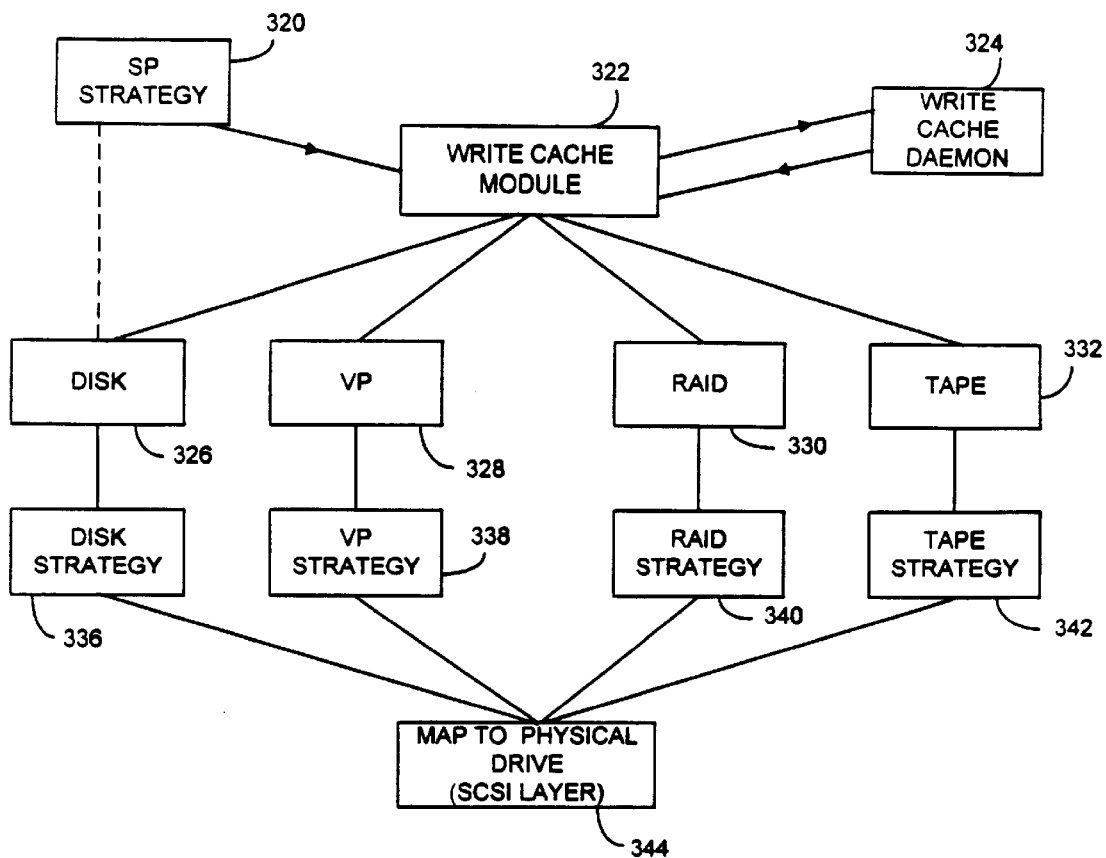
FIG. 7 illustrates software modules operating in the file storage processor of FIG. 4.

Referring now to FIG. 7, the modules for handling messages directed at the storage processor 140 are illustrated in detail. When messages are first received by the storage processor 140, the messages are sent to an SP strategy module 320. The SP strategy module 320 receives all logical requests and decides the appropriate processing based on the FSP major node number. The SP strategy module 320 communicates with a write cache module 322. The write cache module 322 is moved up at a logical level and thus is no longer entangled with low level physical layers. The write cache module 322 in turn communicates with a write cache daemon 324. The write cache module 324 in turn communicates with a disk module 326, a virtual partition (VP) module 328, a RAID module 330, and a Tape module 332. Additionally, the SP strategy module 320 also communicates with the disk module 326 in the event that the write cache is to be bypassed. The disk module 326 in turn communicates with a disk strategy 336. Similarly, the virtual partition module 328 communicates with a virtual partition (VP) strategy module 338, the read module 330 communicates with a read strategy module 340, and the tape module 332 communicates with a tape strategy module 342. Each of these logical strategy modules 336, 338, 340 and 342 accept the logical request. The logical request is then translated into a physical request and the physical request is then directly communicated to a SCSI layer 344 for handling. In this manner, appropriate handling strategies are assigned to logical requests which convert the logical requests into multiple physical disk requests which, in turn, are passed to the SCSI layer 344.

To increase the performance of the system, the system of FIG. 1 leverages the unified memory image capability of the system to provide buffer memory or caches having segments which are dynamically allocatable to different processors. The dynamic allocation process provides additional flexibility which reduces the need to move or shift data around the system of FIG. 1. In this system, a buffer cache controller monitors the location of cached files such that, when an incoming request from one NP results in a hit in the read cache of a second NP, the FSP's buffer cache controller detects the hit and simply requests the second NP to respond. In this manner, the read cache of the individual NPs can be globalized, resulting in additional efficiencies and performance gain as disk accesses are minimized.

Figure 8:
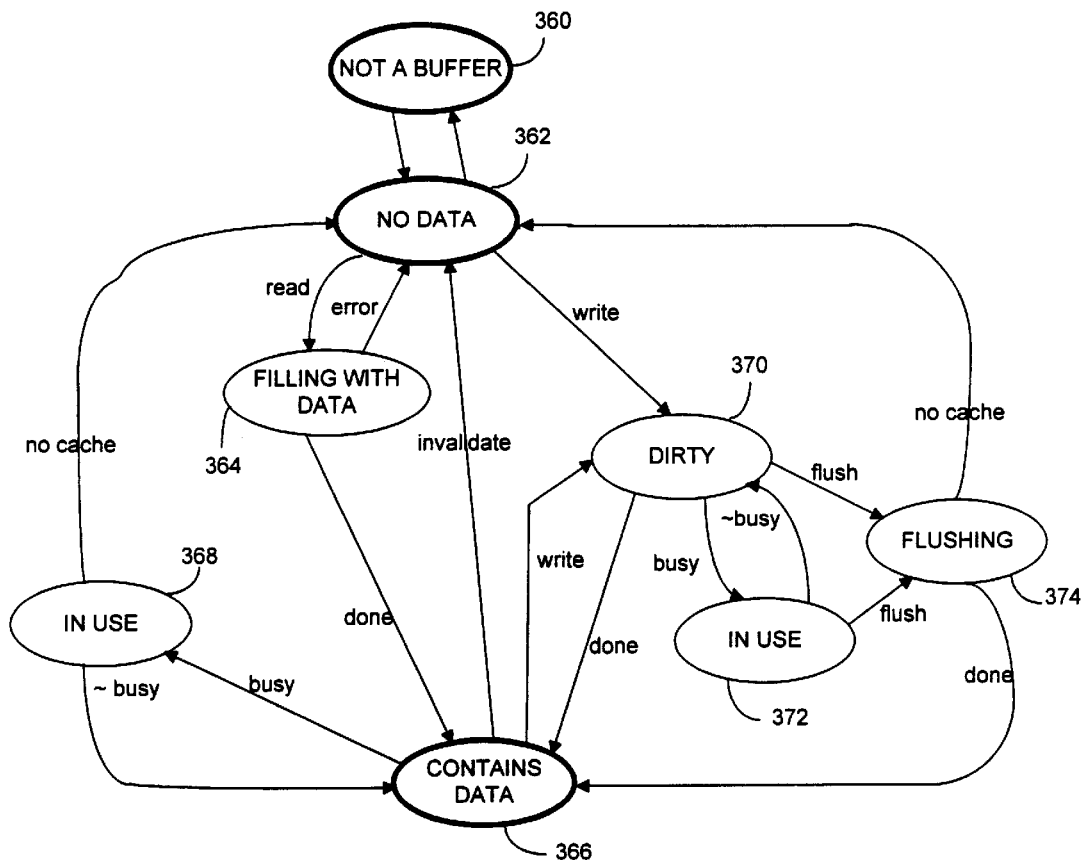
FIG. 8 is a state machine illustrating a life cycle for file system buffers.

Referring now to FIG. 8, a state diagram illustrating the life cycle of the cache buffer in the FSP 150 is shown. The cache buffer of FIG. 8 is disk block oriented and is split among processor nodes. The buffer cache has a buffer header which is the metadata cache. The buffer header describes the contents stored by a data buffer which is the read cache. The data in the buffer cache is hashed by the device number and disk block address.

The buffer in FIG. 8 has a plurality of states: not_a_buffer state 360, no_data state 362, filling_with_data state 364, contains_data state 366, in_use state 368, dirty state 370, a second in_use state 372, and flushing state 374. The not_a_buffer state 360 is a state where the buffer header does not point to a data buffer on the NP. The no_data state 362 indicates the availability of the data buffer on the NP. The filling_with_data state 364 indicates that the data buffer is being filled with data from the disk. The contains data state 366 indicates that data can be accessed to obtain data contained in the particular data buffer on the NP. The in_use states 368 and 372 indicates that the buffer is not to be read, modified, or discarded. The dirty state 370 indicates that the buffer on the NP contains modified data not yet written to disk. The flushing state 374 indicates that contents of the NP buffer are being written to disk.

Referring now to FIG. 8, at the beginning, the buffer is in the not_a_buffer state 360. Next, the buffer transitions from the not_a_buffer state 360 to a no_data state 362. From the no_data state 362, in the event of a read, the buffer transitions from the no_data state 362 to the filling_with_data state 364. Furthermore, while in the filling_with_data state 364, in the event of an error, the buffer returns to the no_data state 362.

Alternatively, in the event that the buffer is in the filling_with_data state 364 and has completed its operation, the buffer transitions to the contains_data state 366. From the contains_data state 366, in the event that an invalidation operation has occurred, the buffer transitions back to the no_data state 362. Further, from the contains_data state 366, in the event that the buffer is busy, the buffer transitions to the in_use state 368 where it remains idle until the disk system is no longer busy. Additionally, while in the in_use state 368, in the event that the cache does not exist, the buffer transitions from the in_use state 368 back to the no_data state 362. While in state 362 or in state 366, in the event of a write, the buffer transitions to the dirty state 370. While in state 370, in the event that the target device is busy, the buffer transitions from the dirty state 370 to the in use state 372 until the target device is no longer busy. Additionally, from the dirty state 370 or the in_use state 372, in the event that the flush operation is to be performed, the buffer transitions to the flushing state 374. While in the dirty state 370 or the flushing state 374, in the event the operation is completed, the buffer transitions to the contains_data state 366. Furthermore, while in the flushing state 374, in the event that the cache does not exist, the buffer transitions to the no_data state 362.

Referring now to FIGS. 9*a*, 9*b*, 10, 11, 12, 13, various request processing models illustrate the process for dynamically allocating buffer memory segments located in one processor, in this case the NP, to other processors such as FSP processors. These models relate to different types of requests which are segregated as to whether they contain data in the message and as to whether buffers for the requests are provided. The request processing models further can be broken down into cases where the network processing 110 supplies buffers or whether the FSP 150 supplies the buffers. In the case of the FSP supplied buffers, the cases can be broken down into situation where 1) no buffers were supplied by the requester; 2) buffers were supplied by the requester; and 3) file write operations.

Figure 9A:
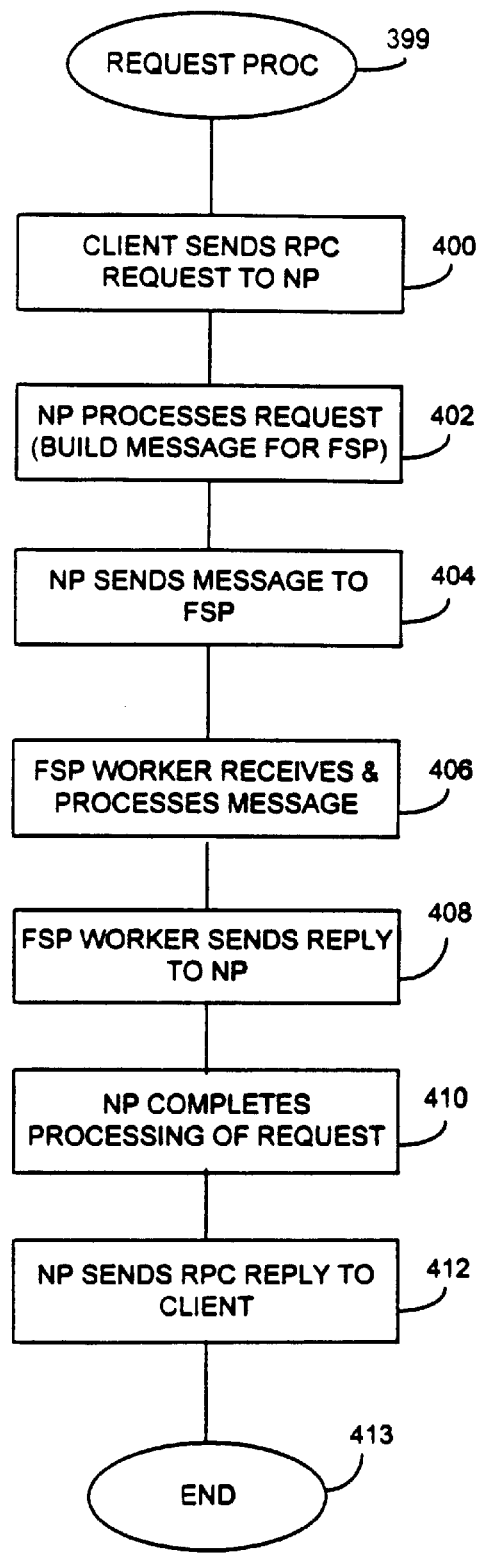
FIG. 9a is a flow chart illustrating a request handling process.

Referring now to FIG. 9*a*, a flow chart for handling requests where the data is included in the message is shown. In FIG. 9*a*, the process 399 the client sends an RPC request to the network processing (Step 400). Next, the network processor processes the request from the client, in this case it builds a message for the file storage processor (step 402). Further, the network processor sends the message to the file storage processor and waits for the reply (step 404). From step 404, a process known as FSP_worker on the file storage processor receives the message and operates on it (step 406). Upon completion of the operation, the FSP_worker sends a reply to the network processor (step 408). The network processor then completes the processing of the request from the client (step 410). Further, it sends the RPC reply to the client (step 412) before exiting (step 413).

Figure 9B:
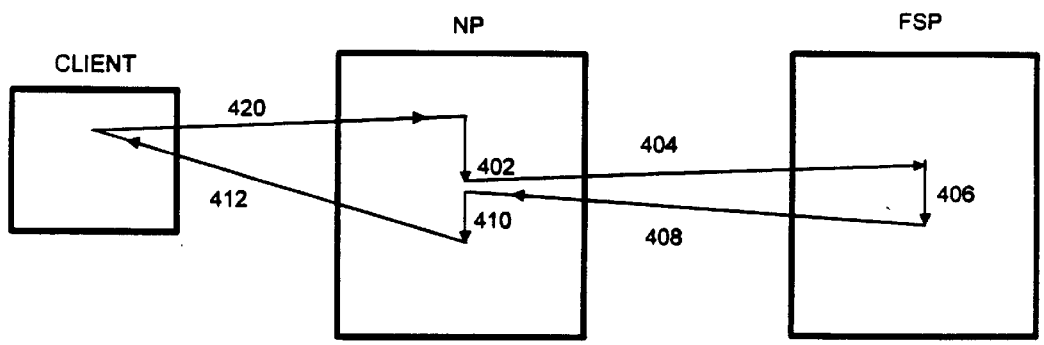

FIG. 9*b* is a schematic illustration of the operation of the flow chart of FIG. 9*a* as they sequentially occur from the client request to the network processor and eventually to the file storage processor. Because this schematic illustration is a more compact representation of events occurring in handling requests, the notation of FIG. 9*b* will be used below to describe the operation of the file system for the computer of FIG. 1.

Figure 10:
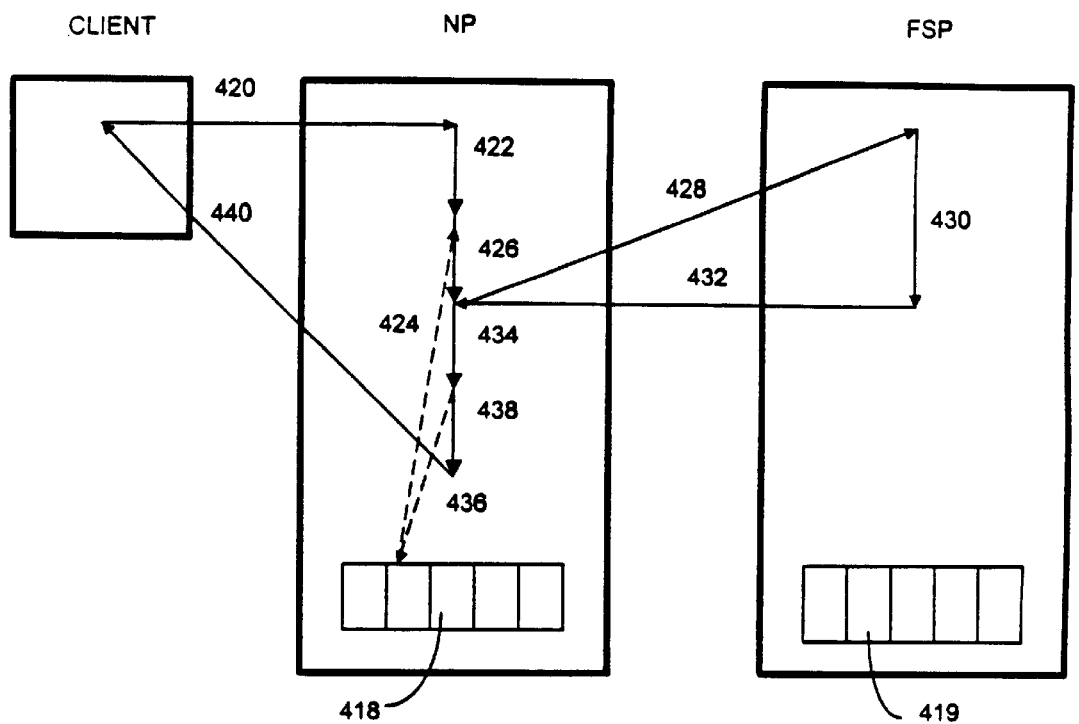
FIG. 10 is a processing model illustrating the process for handling a request when buffers are provided by the network processor.

Referring now to FIG. 10, the process for handling requests where the network processor supplies the buffer is shown. In FIG. 10, the client initially sends an RPC request to the network processor (step 420). In response, the network processor processes the request from the client (step 422). Next, the network processor allocates a buffer 418 to contain data to be sent to the file storage processor (step 424). Then, the network processor fills the buffer with data (step 426). From step 426, the network processor sends a message to the file storage processor and waits for the reply (step 428). At the file processor, a FSP_WORKER receives the message and processes it, such as performing disk input/output operations (step 430). Upon completing the operation, the FSP_worker sends a reply to the network processor (step 432). From step 432, the network processor receives the reply from the file storage processor (step 434). The network processor then sends a release message to FP, (which then frees the buffer or puts into active data cache )before it prepares a reply for the client (step 438). From step 438, the network processor sends the RPC reply to the client (step 440).

Figure 11:
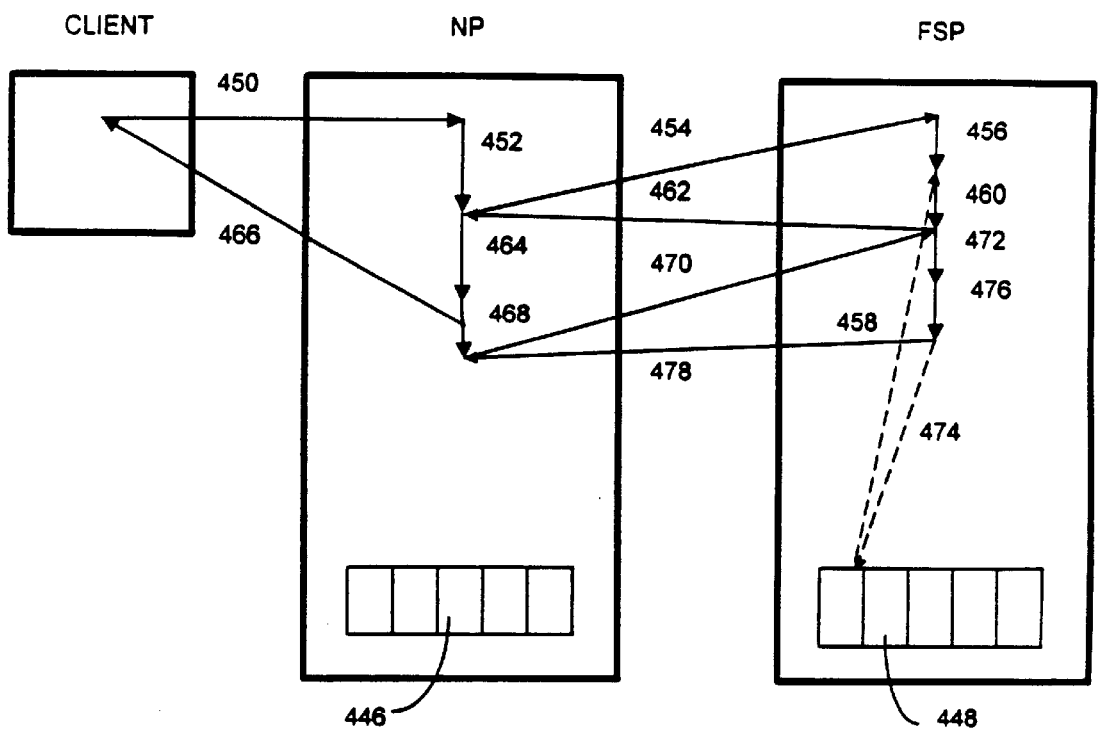
FIG. 11 is a processing model of the process for handling a request when no buffers are supplied by a requester.

Referring now to FIG. 11, the process for handling a request in the event that the request does not supply a buffer is shown. In FIG. 11, the client sends the RPC request to the network processor (step 450). In response, the network processor processes the request from the client and builds the appropriate message for the file storage processor (step 452). Next, the network processor sends the message to the file storage processor and waits for the reply (step 454). In response, the FSP_worker in the file storage processor receives the message and processes it (step 456). The FSP_worker also obtains a buffer 448 to store the request (step 458). Next, the FSP_worker prepares a reply to the network (step 460), sends the reply to the network processing (step 462) and waits for the release message from the network processor. From step 462, the network processor receives the reply from the file storage processor and prepares the RPC reply to the client (step 464). The network processor then sends the RPC reply to the client (step 466) and also prepares a release message for the file storage processor (step 468). The network processor then sends the release message to the FSP_worker that processed the original request (step 470). From step 470, the FSP_worker receives the release message (step 472) and releases the buffer 448 used in the request (step 474). Finally, the FSP_worker prepares the reply to the network processor (step 476). From step 476, the reply is sent to the network processor (step 478).

Figure 12:
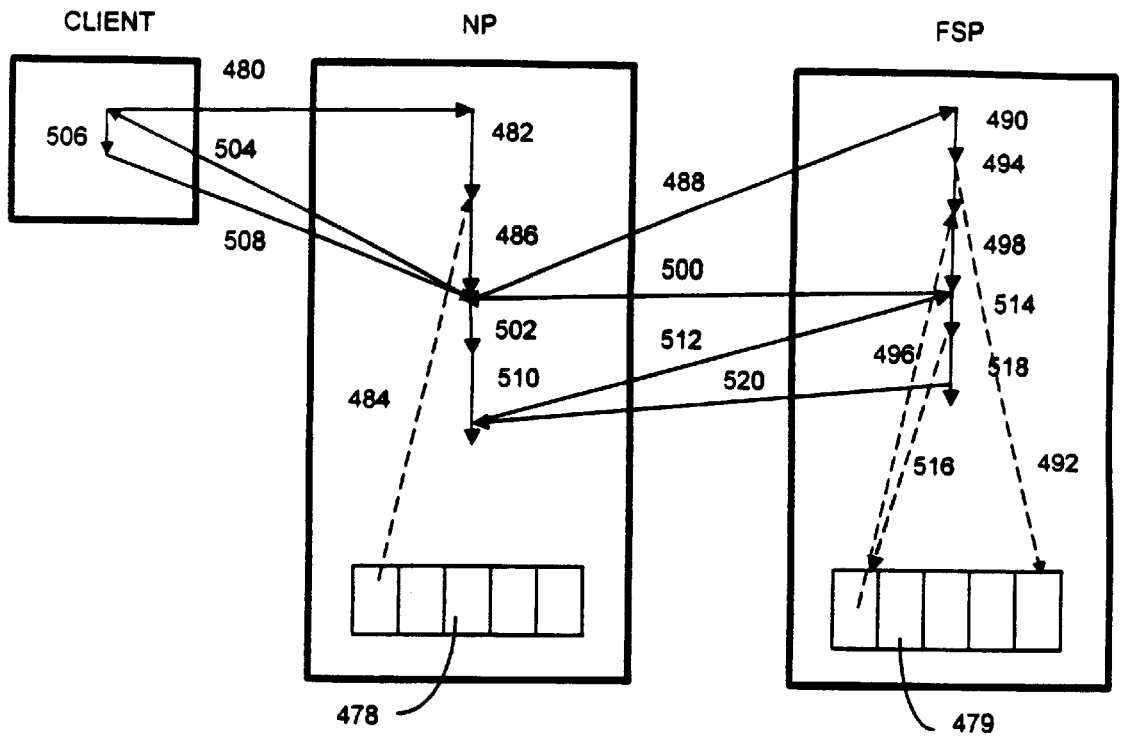
FIG. 12 is a processing model illustrating the handling of a request when buffers are supplied by the requester.

Referring now to FIG. 12, the processing of a request in the event buffers are supplied by the requester is shown. In FIG. 12, the client sends an RPC request to the network processor (step 480). The network processor then processes the request from the client (step 482). Next, the network processor allocates buffers 478 for the request (step 484) and builds a message to be sent to the file storage processor (step 486). The message is sent to the file storage processor and the network processor waits for the reply (step 488). On the file storage processor, a FSP_worker receives the message (step 490). The FSP_worker puts the received buffers on the network processor's free list (step 492) and continues to process the request (step 494). Next, the FSP_worker obtains buffers 479 which contain the requested data and may perform I/O operations (step 496). From step 496, the FSP_worker builds a reply for the network processor (step 498), sends a reply and awaits the release message (step 500). Next, the network processor receives a reply from the file storage processor and builds the RPC reply (step 502). The network processor then sends the RPC reply to the client (step 504) and the client receives the reply (step 506). The client then sends an acknowledged signal (step 508). The network processor receives the acknowledged signal and prepares a release message (step 510). Further, the network processor sends a release message to the FSP_worker that processed the original request (step 512). The FSP worker on the file storage processor receives a release message (step 514) and releases the buffers 479 used in the request (step 516). Subsequently, the FSP_worker prepares a reply to the network processor (step 518) and sends the reply to the network processor (step 520).

Figure 13:
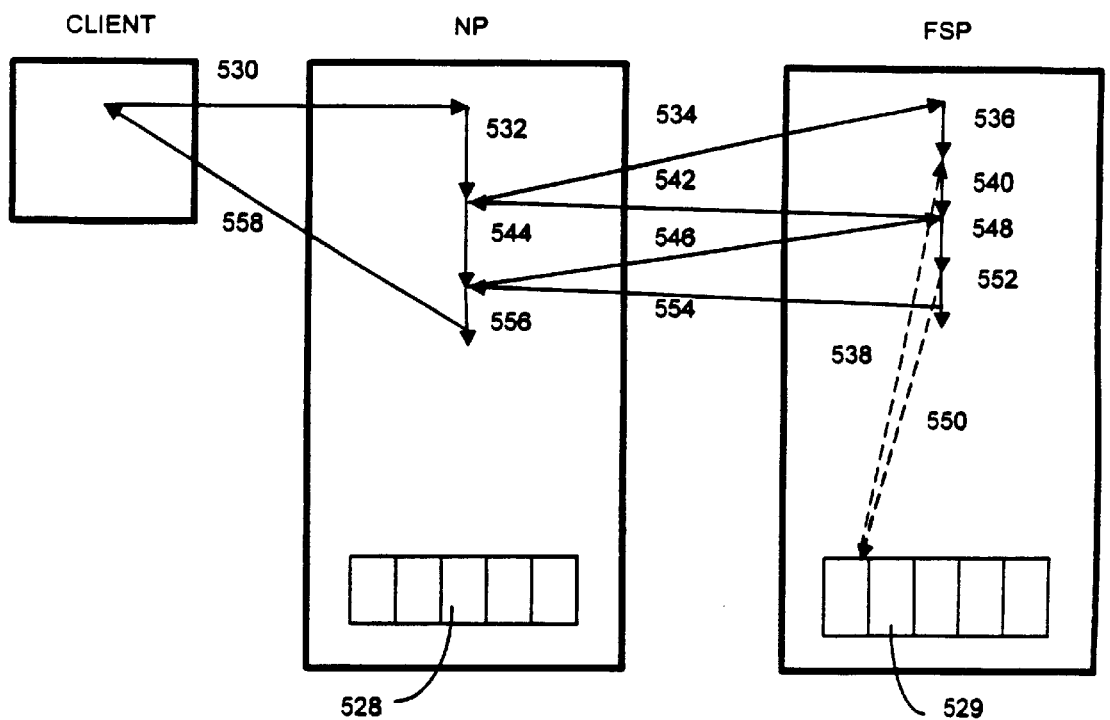
FIG. 13 illustrates a processing model for processing a file write request.

Referring now to FIG. 13, the process for processing a file write request is illustrated. In FIG. 13, the client issues a RPC request to the network processor (step 530). The network processor receives the request from the client and builds a message for the file storage processor (step 532). Next, the network processor sends a message to the file storage processor and waits for the reply (step 534). On the file storage processor side, a FSP_worker receives the message (step 536) and obtains a buffer 529 for the request (step 538). Next, the FSP_worker prepares a reply which includes the buffer address (step 540), sends a reply to the network processor (step 542) and waits for the release message to come back. The network processor puts the data into identified buffers (step 544) and sends a release message to the original FSP_worker (step 546) and also waits for the reply. In turn, the FSP_worker initiates the write of data in the buffer 529 (step 548) and releases the buffer (step 550) before preparing a reply (step 552). The FSP_worker then sends a reply to the network processor (step 554). On the network processor side, the reply is received (step 556) and the network processor in turn sends the RPC reply to the client (step 558).

The buffer memory/cache thus leverages the single memory image capability of the system to provide segments which are dynamically allocatable to different processors. The dynamic allocation process provides additional flexibility which reduces the need to move or shift data around the server system memory.

The architecture is advantageous in that the host processor provides a single point of administration for system utilities and tools, including monitoring, updating, backing-up and tuning software. The architecture further takes advantage of processors which are dedicated and optimized for specific tasks. As function-specific caches are provided with each processor, through-put is further increased. Additionally, the dedicated processors can transfer data with relatively low communication overheads. The resulting system is powerful, scalable and reliable enough to allow users to consolidate their data onto one high performance system that can provide data more quickly and reliably than a conventional client/server architecture.

Because the I/O shortfall is most dramatic in the Unix environment, the description of the preferred embodiment of the present invention was on Unix file servers. The architectural principles that solve the Unix server I/O problem, however, extend easily to server performance bottlenecks in other operating system environments as well, including the Windows-NT operating system, available from Microsoft Corp. of Redmond, Wash. Similarly, the description of the preferred embodiment focused on Ethernet implementations, though the principles extend easily to other types of networks.

Other embodiments are within the scope of the following claims.

What is claimed is:

1. A scalable computer system, comprising:
   an interconnect bus;
   a host processor coupled to the interconnect bus; and
   one or more function-specific processors including network processor, a file processor and a storage processor, the one or more function-specific processors coupled to the interconnect bus for communicating with other processors, each function-specific processor having a buffer memory coupled thereto, the buffer memory having one or more segments which serve as function-specific caches to cache function specific data including network processing data, file processing data and storage processing data, the segments being dynamically allocatable to different processors.

2. The computer system of claim 1, wherein one of the function-specific processor includes:
   a network processor coupled to the interconnect bus;
   one or more network interfaces coupled to the network processor; and
   a read cache coupled to the network processor for buffering requests from the network interfaces.

3. The computer system of claim 1, wherein one of said function-specific processor includes:
   a file processor coupled to the interconnect bus;
   a storage processor coupled to the file processor; and
   one or more data storage devices coupled to the storage processor.

4. The computer system of claim 3, further comprising a metadata cache coupled to the file processor.

5. The computer system of claim 3, further comprising a write cache coupled to the storage processor.

6. The computer system of claim 1, wherein one of said function-specific processor includes:
   a file storage processor (FSP) coupled to the interconnect bus;
   one or more data storage devices coupled to the FSP, each data storage device having files and associated metadata;
   a metadata cache coupled to the FSP for buffering the metadata; and
   a write cache coupled to the FSP for buffering file write operations from the FSP.

7. The computer system of claim 6, further comprising first and second FSP buses.

8. The computer system of claim 7, further comprising a bridge coupling the interconnect bus to the first FSP bus.

9. The computer system of claim 8, further comprising a write buffer coupled to first and second FSP buses.

10. The computer system of claim 9, wherein the write buffer further comprises:
    a memory array for buffering writes to the data storage devices; and
    an exclusive OR engine coupled to the memory array for performing redundant array of inexpensive disk (RAID) operations.

11. The computer system of claim 1, wherein the interconnect bus is a Scalable Coherent Interface (SCI) bus.

12. The computer system of claim 1, further comprising one or more network processors and one or more file storage processors, each of the network processors capable of communicating directly with each of the file storage processors.

13. The computer system of claim 12, further comprising:
    a data storage device coupled to each file storage processor; and
    a bridge coupled to the interconnect bus and to the data storage device for forwarding requests from the network processors to the respective data storage device.

14. The computer system of claim 1, wherein the host computer supports a Unix operating system.

15. The computer system of claim 1, wherein the host computer supports a Windows-NT operating system.

16. The computer system of claim 1, wherein the computer system has a big endian processor and a little endian processor, further comprising a bi-endian messaging system for interprocessor communication.

17. A computer system, comprising:
an interconnect bus;
a host processor coupled to the interconnect bus;
a network processor (NP) coupled to the interconnect bus and sharing a single memory image with other processors, including:
  one or more network interfaces coupled to the NP; and
  a buffer memory coupled to the NP for buffering requests from the network interfaces, the buffer memory having one or more segments which are dynamically allocatable to different processors; and
a file storage processor (FSP) coupled to the interconnect bus, including:
  one or more data storage devices coupled to the FSP, each data storage device having files and associated metadata;
  a metadata cache coupled to the FSP for buffering the metadata, the metadata cache maintaining information on data stored on the NP buffer memory; and
  a write cache coupled to the FSP for buffering file write operations from the FSP,
where the FSP, upon receiving requests for data from the NP, checks the metadata cache to see if a copy of the requested data has been cached in the NP buffer and, if the copy exists in the NP buffer, causing the NP with the data to respond to the request.

18. The computer system of claim 17, wherein the FSP further comprises first and second FSP buses.

19. The computer system of claim 18, further comprising a bridge coupling the interconnect bus to the first FSP bus.

20. The computer system of claim 18, further comprising a write buffer coupled to first and second FSP buses.

21. The computer system of claim 20, wherein the write buffer further comprises:
  a memory array for buffering writes to the data storage devices; and
  an exclusive OR engine coupled to the memory array for performing redundant array of inexpensive disk (RAID) operations.

22. The computer of claim 17, wherein the interconnect bus is a Scalable Coherent Interface (SCI) bus.

23. The computer system of claim 17, wherein the host computer supports a Unix operating system.

24. The computer system of claim 17, wherein the host computer supports a Windows-NT operating system.

25. The computer system of claim 17, wherein the computer system has a big endian processor and a little endian processor, further comprising a bi-endian messaging system for interprocessor communication.

26. The computer system of claim 17, wherein the FSPs collectively provide a single memory image with a memory management that allows a transfer of authority to another FSP and with distributed data content management.

27. The computer system of claim 17, wherein the computer system provides a single system image (SSI) to an application or to a client.

28. The computer system of claim 17, wherein the SSI is used in performing system administration.

29. The computer system of claim 17, wherein data is transferred between data storage devices without host intervention.

30. The computer system of claim 17, wherein the computer system continues to operate when the host processor fails.

31. The computer system of claim 17, wherein the computer system continues to operate when one of the network processors fails.

32. The computer system of claim 17, wherein the computer system continues to operate when one of the file storage processor fails.

33. The computer system of claim 17, wherein the network processor and the file storage processor are mounted on a single board with a shared cache coherent memory and shared I/O device.

34. The computer system of claim 32, wherein the FSP controls the NP buffer memory.

35. The computer system of claim 17, wherein the interconnect bus is an expansion bus on a board.

36. The computer system of claim 17, wherein each of the NP has a mount table for FSP routing purposes.

37. The computer system of claim 17, wherein the NP examines the request and directly forward the request to a server based on predetermined criteria.

38. The computer system of claim 17, wherein the host processor accesses the data storage devices on the FSP as being virtually connected to the host processor.

39. The computer system of claim 17, further comprising a user application, wherein the application may directly access the data storage device of the FSP.

40. A method for operating scalable computer system having an interconnect bus; a host processor coupled to the interconnect bus; a network processor (NP) coupled to the interconnect bus and sharing a single memory image with other processors, each NP having one or more network interfaces coupled to the NP and a buffer memory coupled to the NP for buffering requests from the network interfaces, the buffer memory having one or more segments which are dynamically allocatable to different processors; and a file storage processor (FSP) coupled to the interconnect bus with one or more data storage devices coupled to the FSP, each data storage device having files and associated metadata, a metadata cache coupled to the FSP for buffering the metadata, the metadata cache maintaining information on data stored on the NP buffer memory, and a write cache coupled to the FSP for buffering file write operations from the FSP, comprising:
  receiving a data request from the NP;
  checking the metadata cache to see if a copy of the requested data is cached in the NP buffer; and
  if the copy exists in the NP buffer, transmitting the copy from the NP buffer in response to the request and otherwise accessing the data storage device in accordance with the request.

41. The method of claim 39, wherein the data request arrives at a first NP and wherein the copy of the requested data exists in the buffer of a second NP, further comprising the step of instructing the second NP to respond to the request.

42. The method of claim 39, further comprising the step of storing data in a bi-endian format in the host processor to minimize conversions between big and little endian data types.

43. A method for operating a scalable computer system having an interconnect bus, a host processor coupled to the interconnect bus, and one or more function-specific processors coupled to the interconnect bus for communicating with other processors, each function-specific processor having a buffer memory coupled thereto, the buffer memory having one or more segments which serve as function-specific caches and which are dynamically allocatable to different processors, comprising:

receiving a data request;

checking if a copy of the requested data is cached in one of the function-specific processor; and if the copy exists in one of the function-specific processor, transmitting the copy in response to the request and otherwise accessing the data storage device in accordance with the request.

44. The method of claim 42, wherein the data request arrives at a first function-specific processor and wherein the copy of the requested data exists in a second function specific processor, further comprising the step of instructing the second processor to respond to the request.

45. The method of claim 42, further comprising the step of storing data in a bi-endian format in the host processor to minimize conversions between big and little endian data types.

* * * * *